3,003,917
WOUND HEALING COMPOSITION
Jay Morton Beiler and Gustav J. Martin, Philadelphia, Pa., assignors to The National Drug Company, Philadelphia, Pa., a corporation of Delaware
No Drawing. Filed Jan. 14, 1959, Ser. No. 786,698
4 Claims. (Cl. 167—73)

This invention relates to new compositions useful for the acceleration of the healing of wounds. More particularly, it relates to new compositions comprising relaxin, a proteolytic enzyme or enzymes and an amylolytic enzyme or enzymes which we have shown to be useful for the acceleration of healing of wounds.

We have found that the administration to wounded animals of a composition comprising relaxin, a proteolytic enzyme and an amylolytic enzyme has produced significant increases in the rate of wound healing. We have demonstrated this increase in the rate of wound healing over control animals not receiving any treatment, over control animals receiving a single component of our composition, that is, relaxin or a proteolytic enzyme or an amylolytic enzyme, and over control animals receiving two components of our composition, that is, relaxin and a proteolytic enzyme or relaxin and an amylolytic enzyme or an amylolytic enzyme and a proteolytic enzyme.

Among the proteolytic enzymes which may be used in the formulation of our new composition are trypsin, chymotrypsin, pepsin, papain, bromelin, ficin and mixtures of proteolytic enzymes obtained from bacteria. Among the amylolytic enzymes which may be used in the preparation of our new composition are mixtures of bacterial amylases, pancreatic or $\alpha$-amylase and $\beta$-amylase. We have found a composition comprising relaxin, trypsin and pancreatic amylase to be particularly effective.

The compositions of our invention may be administered intraperitoneally, intramuscularly or subcutaneously in solution and topically in the form of an ointment. The ranges of therapeutic effectiveness for humans of the components in mg. of component are as follows: 2.5–25 for relaxin, 0.5–5 for the proteolytic enzyme and 0.5–5 for the amylolytic enzyme. With animals we prefer to use therapeutic ranges expressed in milligrams of component per kilogram of body weight as follows: 1–25 for relaxin, 0.2–5 for the proteolytic enzyme and 0.2–5 for the amylolytic enzyme. The preferred weight ratio for these compositions of relaxin to the proteolytic enzyme to the amylolytic enzyme is respectively 5:1:1. The ointment is preferably made up to contain approximately 5 mg. of relaxin, 1 mg. of proteolytic enzyme and 1 mg. of the amylolytic enzyme per gram of ointment base.

Examples I and II below demonstrate the usefulness of our composition in the acceleration of various types of wounds in animals.

EXAMPLE I

*Punch wounds in mice.*—Punctures were made in a depilated dorsal area of these animals with a paper punch one-eighth inch in diameter. The compositions indicated in the table below were then administered intraperitoneally. The time taken for healing of the wounds was considered to be the time required for the shedding of the scab over the wound; the animals ranged in weight from twenty to twenty-five grams.

Table I

| Composition Administered (Figures In Parenthesis Indicate Amount Administered in mg./kg.) | Percent of Wounds Healed | |
|---|---|---|
| | After 5 Days | After 9 Days |
| Relaxin (5), Trypsin (1) and Amylase (1) | 38 | 85 |
| Trypsin (1) | 0 | 45 |
| Relaxin (5) | 5 | 50 |
| Amylase (1) | 3 | 48 |
| Trypsin (1) and Relaxin (5) | 20 | 38 |
| Trypsin (1) and Amylase (1) | 13 | 60 |
| Relaxin (5) and Amylase (1) | 13 | 62 |
| Control | 3 | 42 |

Similar results are obtained when other proteolytic enzymes, such as chymotrypsin, or a mixture of proteolytic eznymes as those obtained from bacteria are used in place of trypsin in approximately the same amount.

Similar results are also obtained when mixtures of amylases obtained from bacteria are used in approximately the same amount in place of the pancreatic amylase.

EXAMPLE II

*Scalpel wounds on rats.*—A longitudinal wound, approximately one centimeter in length, was made with a scalpel through the skin layer in the depilated area of the shoulder blades. The edges of the wound were approximated and adhesive tape was applied. After a few days, the tape fell off by itself. At this time, the edges of the wound were adhered and healing was allowed to proceed without further treatment other than that dictated by the experimental design. At stated periods after the wounding, a number of animals of each experimental group were sacrificed, and a strip of skin, 0.5 cm. in width and 5–7 cm. in length, was cut across the wound. The tensile strength of this tissue was then determined by the method of Charney et al., Science 105, 396 (1947). After the wounding an ointment base containing 1 mg. of trypsin per gram of base, 1 mg. of pancreatic amylase per gram of base and 5 mg. of relaxin per gram of base was applied topically to the wound. Table II below shows the rate of healing in the control and the treated groups.

Table II

| Group | Percent of Wounds Healed | | |
|---|---|---|---|
| | After 5 Days | After 10 Days | After 12 Days |
| Control | 10 | 40 | 45 |
| Treated | 25 | 80 | 90 |

Table III below compares the tensile strengths in grams of mercury required to tear the tissue of the healed tissues of control and treated animals.

Table III

| Group | Tensile Strengths | | | |
|---|---|---|---|---|
| | 1 Week | 2 Weeks | 3 Weeks | 4 Weeks |
| Control | 818 | 1,627 | 3,004 | 4,903 |
| Treated | 761 | 2,893 | 4,091 | 5,573 |

The results clearly demonstrate the effectiveness of our composition in increasing the rate of wound healing.

Relaxin, the various proteolytic enzymes, the various amylolytic enzymes, mixtures of proteolytic enzymes from bacteria, and mixtures of the amylolytic enzymes from bacteria are commercially available.

Examples III and IV describe pharmaceutical preparations embodying the compositions of our invention.

EXAMPLE III

An injectable product containing 5 mg. of trypsin, 5 mg. of pancreatic amylase and 25 mg. of relaxin per ml. of injection, is prepared in the following manner.

Twenty-five grams of trypsin is dissolved in 250 ml. of cool water for injection. Similarly, 25 gm. of pancreatic amylase is dissolved in 250 ml. of cool water for injection, and 125 gm. of relaxin is dissolved in 1250 ml. of cool water for injection. The three solutions are combined, brought to a volume of 2000 ml., and the mixed solution is sterilized by filtration. Under aseptic technique, 2 ml. of the solution is filled into each of 1000 five-ml. ampul-vials. The solution in these vials is then evaporated by the process of lyophilization, until the moisture content of the enzymes-relaxin mixture is reduced to about 0.5%. The vials are then capped and sealed under aseptic conditions.

For parenteral administration, the contents of one vial are dissolved by the addition of 5 ml. of a sterile solution containing 0.08% of methylparaben, 0.02% of propylparaben, 5% of denatured gelatin, and adjusted to pH 3.5.

EXAMPLE IV

An ointment containing in each gram one mg. of trypsin, one mg. of pancreatic amylase, and 5 mg. of relaxin is prepared in the following manner:

A solution is prepared which contains 1.0 gm. of methylparaben, 0.2 gm. of propylparaben, and 200 gm. of denatured gelatin in 550 ml. of distilled water. The pH of the solution is adjusted to 4.0 by means of hydrochloric acid.

The solution is then cooled to a temperature of 22–25° C. and one gm. of trypsin, one gm. of pancreatic amylase, and 5 gm. of relaxin are dissolved therein.

Fifty grams of pectin is made into a smooth paste with 150 gm. of glycerin, and this mixture is added gradually, with stirring, to the solution described in the previous paragraph. Enough distilled water is added to make the product weigh 1000 gm. Stirring is continued until the product thickens to the consistency of an ointment.

We claim:

1. A composition useful for increasing the rate of wound healing which comprises 1 to 25 parts by weight of relaxin, 0.2 to 5 parts by weight of a proteolytic enzyme selected from the group consisting of trypsin, chymotrypsin and ficin and 0.2 to 5 parts by weight of an amylase selected from the group consisting of alpha-amylase and beta-amylase.

2. A composition useful for increasing the rate of wound healing which comprises 1 to 25 parts by weight of relaxin, 0.2 to 5 parts by weight of trypsin and α-amylase.

3. A composition useful for increasing the rate of wound healing which comprises 1–25 parts by weight of relaxin, 0.2–5 parts by weight of trypsin, and 0.2–5 parts by weight of α-amylase.

4. The composition of claim 3 wherein the weight ratio of relaxin to trypsin to α-amylase is respectively 5:1:1.

References Cited in the file of this patent

Drug Trade News (1), June 17, 1957, 32:12, page 65, Mfg. Sect.

Drug Trade News (2), June 30, 1958, 33:13, page 43, Mfg. Sect.

Casten et al.; J.A.M.A. 166:4, pp. 319–324, Jan. 25, 1958.

Science News Letter (1), July 20, 1957, 72:3, p. 39.

Science News Letter (2), November 17, 1956.

J.A.M.A., August 11, 1956, p. 1514.

Stanford Medical Bulletin, vol. 10, August 1952, pp. 186–187.

Lesser, Drug and Cosmetics Industry, 71:2, pp. 178–179, 250–254, August 1952.

Physicians Desk Reference, 11th ed., 1957, p. 545.

"Varidase," published by Lederle Laboratories, N.Y., June 1951, 49 pp., esp. pp. 1–16.

Altmeier et al.: Annals of Surgery, 134:4, pages 581–583, October, 1951.